(12) United States Patent
Nishio et al.

(10) Patent No.: US 11,804,223 B2
(45) Date of Patent: Oct. 31, 2023

(54) INFORMATION PROCESSING SYSTEM, INFORMATION PROCESSING METHOD, AND RECORDING MEDIUM HAVING STORED THEREON INFORMATION PROCESSING PROGRAM

(71) Applicant: SHARP KABUSHIKI KAISHA, Sakai (JP)

(72) Inventors: Tatsuya Nishio, Sakai (JP); Fumiaki Sugimori, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 312 days.

(21) Appl. No.: 17/240,867

(22) Filed: Apr. 26, 2021

(65) Prior Publication Data
US 2021/0366478 A1    Nov. 25, 2021

(30) Foreign Application Priority Data

May 20, 2020 (JP) ................................ 2020-087888

(51) Int. Cl.
 *G06Q 10/101* (2023.01)
 *G10L 15/22* (2006.01)
 *G10L 15/26* (2006.01)

(52) U.S. Cl.
 CPC .............. *G10L 15/22* (2013.01); *G10L 15/26* (2013.01); *G06Q 10/101* (2013.01); *G10L 2015/225* (2013.01)

(58) Field of Classification Search
 CPC .................................................. G06Q 10/101
 See application file for complete search history.

(56) References Cited

U.S. PATENT DOCUMENTS

| | | | | |
|---|---|---|---|---|
| 7,844,454 B2* | 11/2010 | Coles | ...................... | G10L 15/26 704/235 |
| 8,370,142 B2* | 2/2013 | Frankel | ................... | G10L 15/32 704/235 |
| 2013/0089189 A1* | 4/2013 | Mikan | ..................... | G10L 15/26 379/88.14 |
| 2014/0108557 A1* | 4/2014 | Calman | .................. | G06Q 40/02 709/205 |

FOREIGN PATENT DOCUMENTS

JP          2013-009434 A       1/2013

* cited by examiner

*Primary Examiner* — Feng-Tzer Tzeng
(74) *Attorney, Agent, or Firm* — ScienBiziP, P.C.

(57) ABSTRACT

An information processing system according one embodiment includes: a voice receiver which receives a first voice uttered by a first user of a first information processing device; a voice recognizer which recognizes the first voice received by the voice receiver; a display controller which causes a first text, which corresponds to the first voice recognized by the voice recognizer, to be displayed in each of first display areas of the first information processing device and a second information processing device, and a second display area of the first information processing device; and a correction reception portion which receives a correction operation of the first user for the first text displayed in the second display area.

12 Claims, 15 Drawing Sheets

INFORMATION PROCESSING SYSTEM, INFORMATION PROCESSING METHOD, AND RECORDING MEDIUM HAVING STORED THEREON INFORMATION PROCESSING PROGRAM

INCORPORATION BY REFERENCE

This application is based upon and claims the benefit of priority from the corresponding Japanese Patent Application No. 2020-087888 filed on May 20, 2020, the entire contents of which are incorporated herein by reference.

BACKGROUND

The present disclosure relates to an information processing system, an information processing method, and a recording medium having stored thereon an information processing program.

Conventionally, there has been known a conferencing system which transmits and receives a voice uttered by a user, text information obtained by recognizing the voice and converting the recognized voice into text, a video image of the user, and the like. Further, a technique for translating the voice into text information of a desired language, and then performing transmission/reception of the voice together with the text information has been proposed (see, for example, Japanese Patent No. 5374629).

Here, with the conventional technique, if an error occurs in the text obtained by converting the voice uttered by the user, for example, erroneous information is presented to a destination side user to whom the converted text is transmitted. Also, in this case, it is possible that the user on the other side will respond to the erroneous information. As can be seen, with the conventional technique, if an error occurs in the text information corresponding to the voice uttered by the user, it is difficult to smoothly transmit and receive appropriate text information.

SUMMARY

An object of the present disclosure is to provide an information processing system, an information processing method, and a recording medium having stored thereon an information processing program by which appropriate text information can be smoothly transmitted and received, in a case where an error occurs in the text information corresponding to a voice uttered by the user.

An information processing system according to one aspect of the present disclosure pertains to an information processing system which allows transmission and reception of text information corresponding to a voice uttered by a user in a first information processing device and a second information processing device which are connected to each other via a network, in which the information processing system includes: a voice receiver which receives a first voice uttered by a first user of the first information processing device; a voice recognizer which recognizes the first voice received by the voice receiver; a display controller which causes a first text, which corresponds to the first voice recognized by the voice recognizer, to be displayed in a first display area included in each of a display of the first information processing device and a display of the second information processing device, and in a second display area included in the display of the first information processing device; and a correction reception portion which receives a correction operation of the first user for the first text which is displayed in the second display area.

An information processing method according to another aspect of the present disclosure pertains to an information processing method for allowing transmission and reception of text information corresponding to a voice uttered by a user in a first information processing device and a second information processing device which are connected to each other via a network, in which the information processing method employs one or more processors to execute: voice receiving of receiving a first voice uttered by a first user of the first information processing device; voice recognizing of recognizing the first voice received by the voice receiving; displaying of causing a first text, which corresponds to the first voice recognized by the voice recognizing, to be displayed in a first display area included in each of a display of the first information processing device and a display of the second information processing device, and in a second display area included in the display of the first information processing device; and correction reception of receiving a correction operation of the first user for the first text which is displayed in the second display area.

A recording medium having stored thereon an information processing program according to yet another aspect of the present disclosure pertains to an information processing program, the information processing program causing one or more processors to execute information processing, the information processing allowing transmission and reception of text information corresponding to a voice uttered by a user in a first information processing device and a second information processing device which are connected to each other via a network, and includes: voice receiving of receiving a first voice uttered by a first user of the first information processing device; voice recognizing of recognizing the first voice received by the voice receiving; displaying of causing a first text, which corresponds to the first voice recognized by the voice recognizing, to be displayed in a first display area included in each of a display of the first information processing device and a display of the second information processing device, and in a second display area included in the display of the first information processing device; and correction reception of receiving a correction operation of the first user for the first text which is displayed in the second display area.

According to the present disclosure, it is possible to smoothly transmit and receive appropriate text information, in a case where an error occurs in the text information corresponding to a voice uttered by the user.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments of the present invention will hereinafter be described with reference to the accompanying drawings. Note that the following embodiment represents an example in which the present invention is embodied, and is not intended to limit the technical scope of the present invention.

An information processing system according to the present disclosure can be applied to a remote conference which is realized by network connecting a plurality of sites (areas), for example, and in which a plurality of users participate. For example, the information processing system transmits and receives voices uttered by users at a first site and a second site that are connected to each other via a network.

Also, the information processing system according to the present disclosure causes text information corresponding to a voice uttered by the user at the first site to be displayed on an information processing device disposed at the second site, and causes text information corresponding to a voice uttered by the user at the second site to be displayed on an information processing device disposed at the first site.

In the following embodiment, a case where the information processing system is applied to a remote conference (a conferencing system) will be described as an example. That is, a conferencing system according to the present embodiment is an example of the information processing system according to the present disclosure. For example, in the conferencing system according to the present embodiment, information processing devices are disposed in respective sites (conference rooms), and the information processing device in one conference room receives a voice uttered by the user, and transmits text information corresponding to the voice recognized by a server to the information processing device in the other conference room. Thereby, a conversation between the users in the respective conference rooms is enabled.

Conferencing System 100

Figure 1:
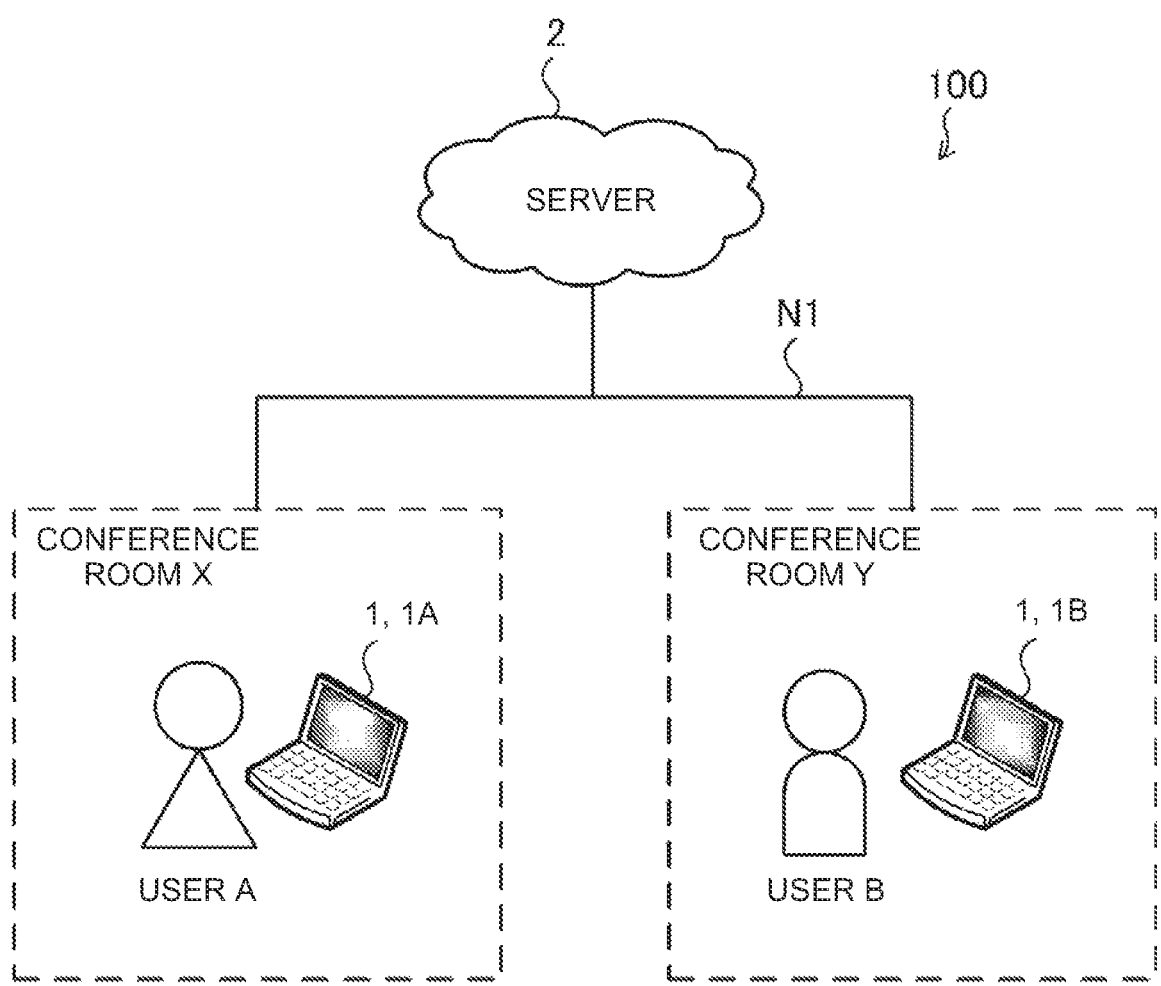
FIG. 1 is a diagram illustrating a schematic structure of a conferencing system according to an embodiment of the present disclosure.

FIG. 1 is a diagram illustrating a schematic structure of a conferencing system according to an embodiment of the present disclosure. A conferencing system 100 is provided with an information processing device 1 which is disposed in each site (conference room), and a server 2. As illustrated in FIG. 1, each of information processing devices 1A and 1B is configured as an integrated device including a microphone, a speaker, and a display. Alternatively, each of the information processing devices 1A and 1B may be a device configured from a microphone, a speaker, and a personal computer (PC), which are separate units. FIG. 1 illustrates the information processing device 1A installed in conference room X, and the information processing device 1B installed in conference room Y. The information processing device 1A, the information processing device 1B, and the server 2 are connected to each other via a network N1. The network N1 is a communication network such as the Internet, a LAN, a WAN, or a public telephone line. The information processing device 1A is an example of a first information processing device of the present disclosure, and the information processing device 1B is an example of a second information processing device of the present disclosure.

In the conferencing system 100, the information processing device 1A, for example, receives a voice uttered by user A in conference room X, and the server 2 executes recognition processing of the voice, translation processing of performing translation into another language, and the like, and converts the voice into text. The information processing device 1A transmits a result of voice recognition by the server 2 (i.e., text information corresponding to the voice) to the information processing device 1B in conference room Y. The information processing device 1B causes the text information, which is received from the information processing device 1A, to be displayed on the display, and causes the voice to be output from the speaker. Similarly, the information processing device 1B receives a voice uttered by user B in conference room Y, and the server 2 executes recognition processing of the voice, translation processing of performing translation into another language, and the like, and converts the voice into text. The information processing device 1B transmits a result of voice recognition by the server 2 (i.e., text information corresponding to the voice) to the information processing device 1A in conference room X. The information processing device 1A causes the text information, which is received from the information processing device 1B, to be displayed on the display, and causes the voice to be output from the speaker. In this way, users A and B who are in conference rooms X and Y, respectively, can have a conversation.

Here, in the conferencing system 100, there may be a case where an error occurs in the text obtained by converting the voice uttered by the user. The conferencing system 100 can smoothly transmit and receive appropriate text information, in a case where an error occurs in the text information corresponding to the voice uttered by the user. In the following, a specific configuration of the conferencing system 100 will be described. Note that in the following description, when the information processing devices 1A and 1B need not to be distinguished, they will be referred to as "information processing device 1".

Information Processing Device 1

Figure 2:
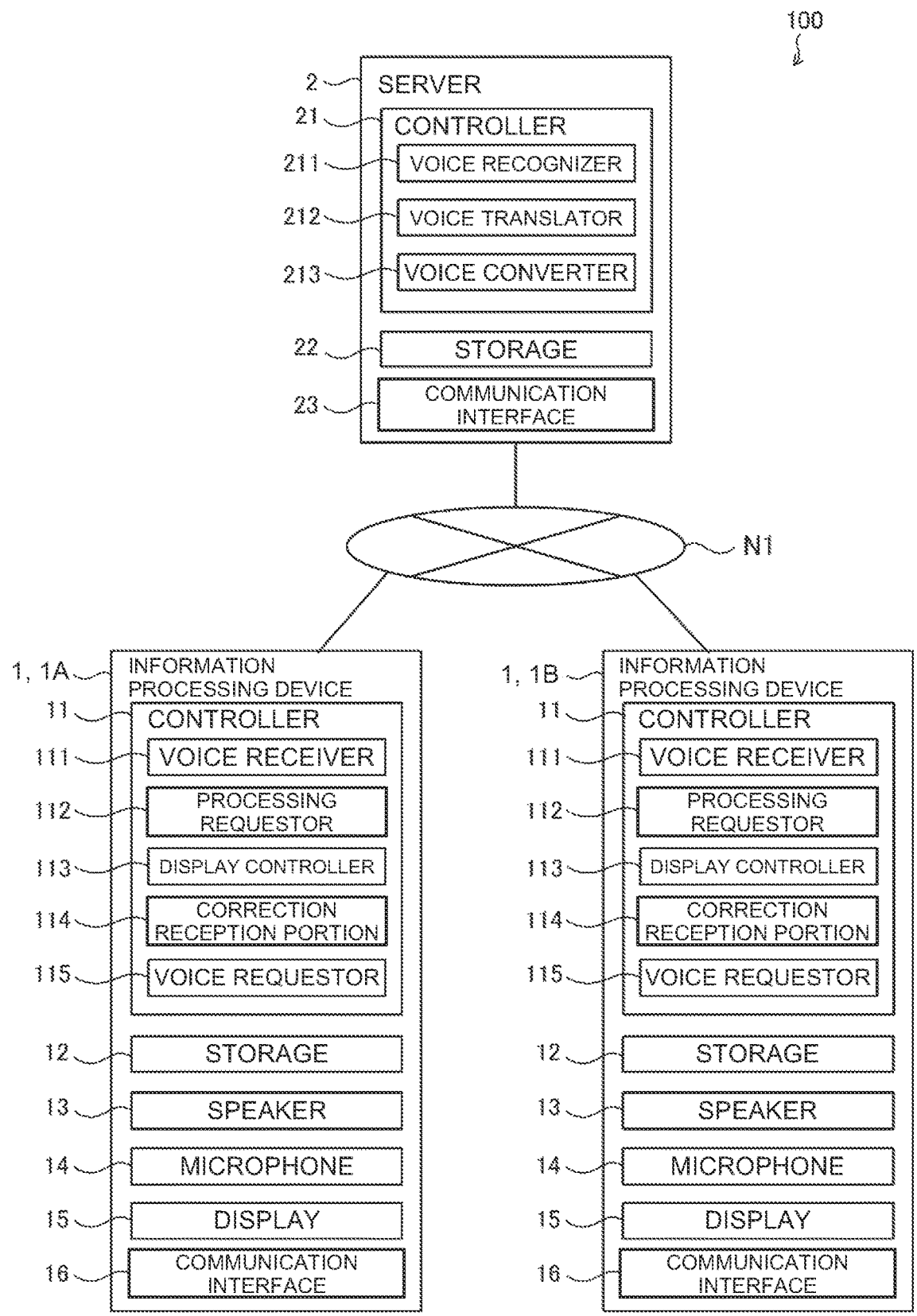
FIG. 2 is a functional block diagram showing the structure of the conferencing system according to the embodiment of the present disclosure.

The information processing devices 1 disposed at respective sites (conference rooms X and Y in this case) have the same configuration. Here, the information processing device 1A disposed in conference room X will be described as an example. As illustrated in FIG. 2, the information processing device 1A is provided with a controller 11, a storage 12, a speaker 13, a microphone 14, a display 15, a communication interface 16, and the like. The information processing device 1A is, for example, a personal computer. The microphone 14 may be arranged outside the personal computer, and connected to the personal computer via a communication cable. The information processing device 1A is placed, for example, on a desk of conference room X, and acquires a voice of user A who participates in a conference via the microphone 14, or outputs (notifies), to user A, a voice from the speaker 13.

The communication interface 16 is a communication interface for connecting the information processing device 1A to the network N1 in a wired or wireless manner, and executing data communication conforming to a predetermined communication protocol with the other devices (for example, the information processing device 1B, the server 2, and the like) via the network N1.

The display 15 is a display panel such as a liquid crystal display or an organic EL display which displays various kinds of information.

The storage 12 is a non-volatile storage such as a hard disk drive (HDD) or a solid state drive (SSD) which stores various kinds of information. The storage 12 stores a control program such as an information processing program for causing the controller 11 to execute information processing (FIGS. 13 and 14) to be described later. For example, the information processing program is distributed from an external server and stored. Further, the information processing program may be permanently recorded on a computer-readable recording medium such as a CD or a DVD, and stored in the storage 12 by being read by a reading device (not illustrated) such as a CD drive or a DVD drive provided in the information processing device 1.

The controller 11 includes control devices such as a CPU, a ROM, and a RAM. The CPU is a processor which executes various kinds of arithmetic processing. The ROM stores in advance the control programs such as a BIOS and an OS for causing the CPU to execute various kinds of processing. The RAM stores various kinds of information, and is used as a temporary storage memory (work area) for the various kinds of processing that the CPU executes. Further, the controller 11 controls the information processing device 1A by having the CPU execute various control programs stored in advance in the ROM or the storage 12.

Specifically, the controller 11 includes various processing portions such as a voice receiver 111, a processing requestor 112, a display controller 113, a correction reception portion 114, and a voice requestor 115. Note that the controller 11 functions as various processing portions as described above by having the CPU execute various kinds of processing according to the control program. Also, a part of or all of the processing portions included in the controller 11 may be configured by an electronic circuit. Further, the information processing program may be a program for causing a plurality of processors to function as various processing portions mentioned above.

The voice receiver 111 receives a voice (voice data) uttered by user A who uses the information processing device 1A from the microphone 14. The voice receiver 111 is an example of a voice receiver of the present disclosure. For example, the voice receiver 111 of the information processing device 1A receives the voice uttered by user A in conference room X, and the voice receiver 111 of the information processing device 1B receives the voice uttered by user B in conference room Y.

Also, the voice receiver 111 transmits status information indicating that the voice of user A is being received (in other words, user A is speaking) to the information processing device 1B.

The processing requestor 112 requests the server 2 to execute various kinds of processing. Specifically, the processing requestor 112 requests recognition processing of the voice (voice data) received by the voice receiver 111. When the server 2 acquires a voice recognition request from the information processing device 1A, the server 2 executes the recognition processing on the voice, and transmits a recognition result to the information processing device 1A. For example, in a case where the server 2 has performed the processing of converting the voice into text (characters), the server 2 transmits, to the information processing device 1A, the text information as the recognition result.

Further, the processing requestor 112 requests translation processing of the voice received by the voice receiver 111. When the server 2 acquires a voice translation request from the information processing device 1A, the server 2 executes the translation processing on the text corresponding to the voice, and transmits a translation result to the information processing device 1A. For example, in a case where the server 2 has translated the text corresponding to the voice in a first language (for example, Japanese) into text of a second language (English), the server 2 transmits text information of the second language as the translation result to the information processing device 1A.

Figure 3:
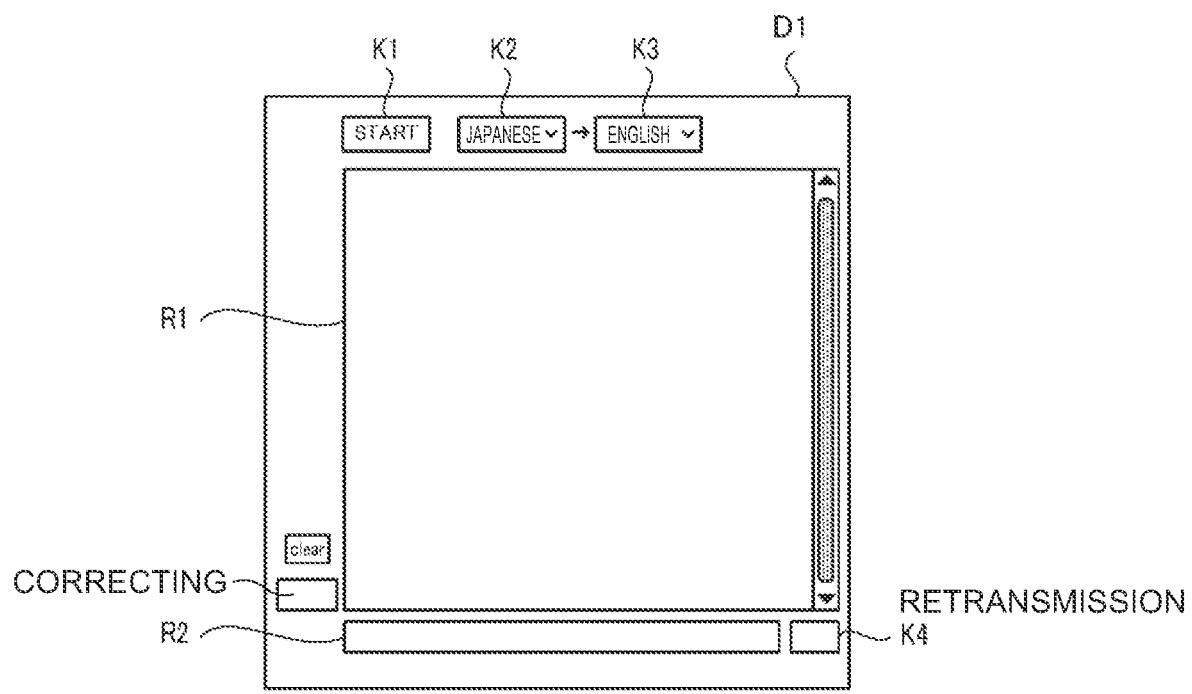
FIG. 3 is a diagram illustrating an example of a display screen displayed in an information processing device of the conferencing system according to the embodiment of the present disclosure.

The display controller 113 causes the display 15 to display various kinds of information. Specifically, the display controller 113 causes the display 15 to display a display screen D1 corresponding to a display processing program. FIG. 3 is a diagram illustrating an example of the display screen D1. The display screen D1 includes: a button K1 for starting and ending recording of a voice uttered by user A; a button K2 for selecting the language of the uttered voice (for example, Japanese); a button K3 for selecting a target language of translation (for example, English) for the language of the uttered voice; a second display area R2 for displaying a text corresponding to the voice uttered by user A in real time; a first display area R1 for displaying a text corresponding to the utterance content of user A in a period segmented at a predetermined timing; and a button K4 for use when user A corrects (manually corrects) the text displayed in the second display area R2, and makes a request again (i.e., retransmission) to the server 2 for the recognition processing, translation processing, etc.

Figure 4:
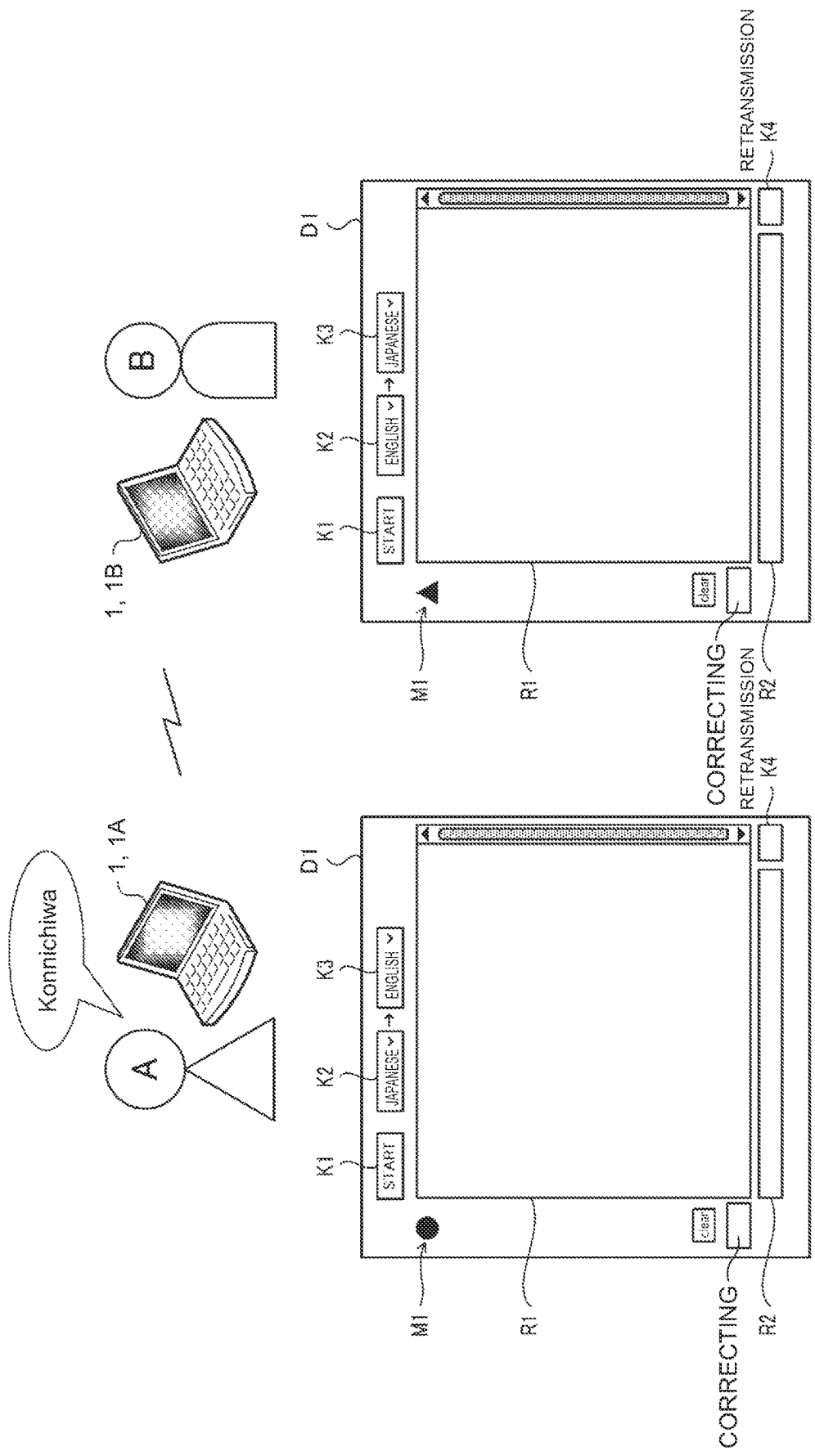
FIG. 4 is a diagram illustrating an example of a display screen displayed in an information processing device of the conferencing system according to the embodiment of the present disclosure.

For example, when user A presses the button K1 and starts to speak, and the voice receiver 111 starts to receive the voice, the display controller 113 of the information processing device 1A displays, as shown in FIG. 4, identification information (a speaking-in-progress mark M1) indicating that user A is speaking on the display screen D1 of the information processing device 1A. Further, when the display controller 113 of the information processing device 1B acquires the status information (speaking) from the information processing device 1A, the display controller 113 of the information processing device 1B displays, as shown in FIG. 4, identification information (speaking-in-progress mark M1) indicating that user A is speaking on the display screen D1 of the information processing device 1B. Note that the speaking-in-progress mark M1 may be different for each information processing device 1, or may include information (the name, user ID, etc.) by which the user who is speaking can be identified.

Further, the display controller 113 of the information processing device 1A displays, in each of the first display area R1 and the second display area R2 of the information processing device 1A, a text (an example of a first text of the present disclosure) corresponding to the voice of user A (an example of a first voice of the present disclosure) which is recognized by a voice recognizer 211 (described later) of the server 2. Also, the display controller 113 of the information processing device 1B displays the text corresponding to the voice of user A recognized by the voice recognizer 211 of the server 2 in the first display area R1 of the information processing device 1B.

Figure 5:
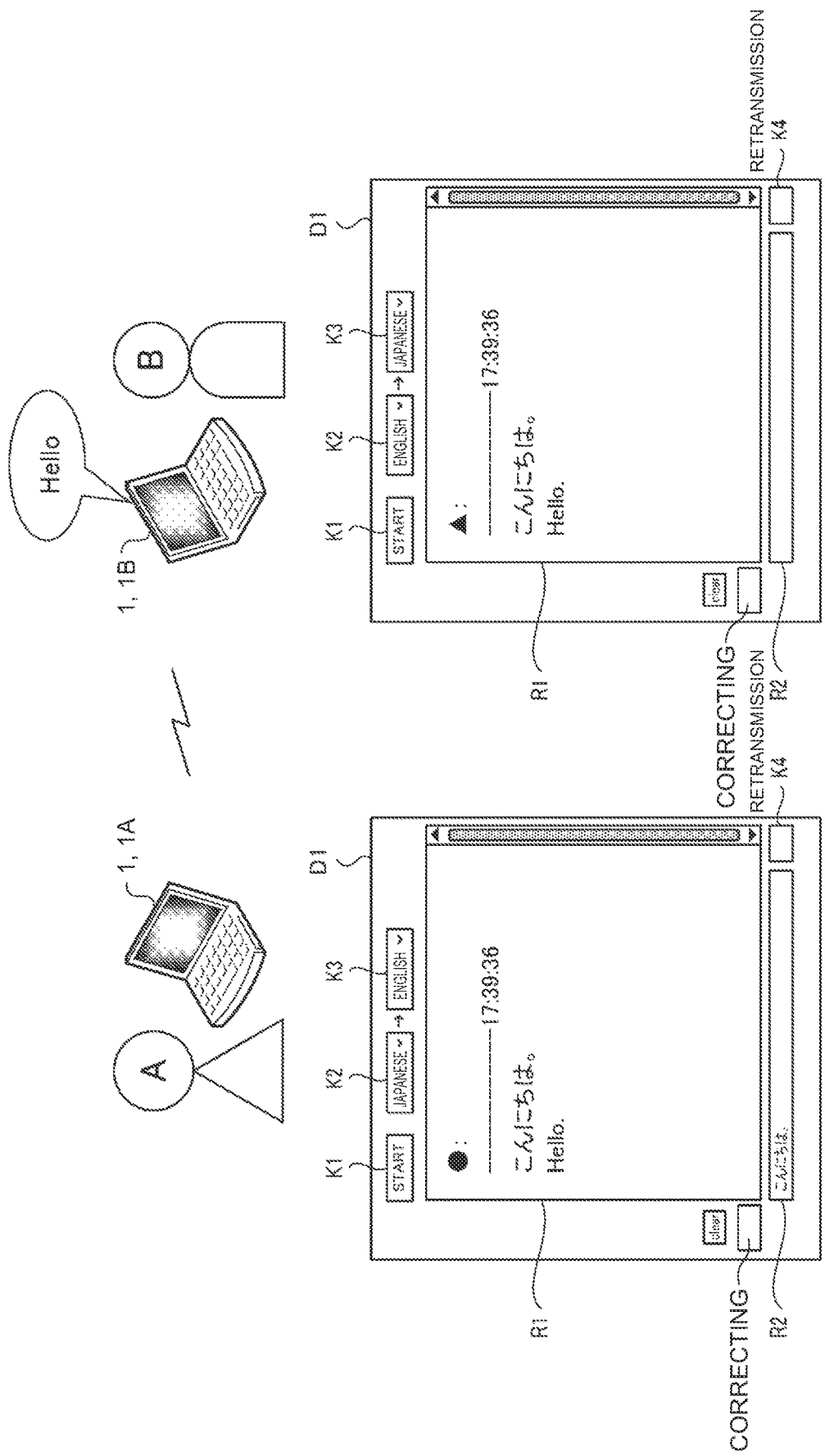
FIG. 5 is a diagram illustrating an example of a display screen displayed in an information processing device of the conferencing system according to the embodiment of the present disclosure.

For example, when user A utters "Konnichiwa", the display controller 113 of the information processing device 1A displays, as shown in FIG. 5, the text "こんにちは。" (the text constituted of characters representing "Konnichiwa" in Japanese) corresponding to the voice of user A in each of the first display area R1 and the second display area R2 of the information processing device 1A. Further, the display controller 113 of the information processing device 1A displays "こ" (the text constituted of a character representing "ko" in Japanese) in the second display area R2 at the time when "ko" uttered by user A is recognized, and successively displays "ん" (the text constituted of a character representing "n" in Japanese) in the second display area R2 at the time when "n" uttered by user A is recognized. In this way, the display controller 113 causes the text to be displayed in the second display area R2 in real time in response to the utterance of user A. If no utterance is made for a predetermined time after user A has uttered "wa", the display controller 113 of the information processing device 1A acquires results of the recognition processing and translation processing for "Konnichiwa" from the server 2, and causes the results to be displayed in the first display area R1, as shown in FIG. 5. In this way, the display controller 113 causes the text to be displayed in the second display area R2 in real time according to the utterance of user A, and causes the text corresponding to the utterance content in a period segmented at a predetermined timing to be displayed in the first display area R1. Also, the display controller 113 causes the text of the first language to be displayed in the second display area R2 in real time according to the utterance in the first language of user A, and causes text of the second language, which is obtained by converting (translating) the text corresponding to the utterance content in the period segmented at the predetermined timing into the second language, to be displayed in the first display area R1.

The display controller 113 of the information processing device 1A may display the time when user A made the utterance (here, "17:39:36") (i.e., an example of the first text of the present disclosure) in the first display area R1.

Further, the display controller 113 of the information processing device 1A transmits the results of the recognition processing and the translation processing, and the status information (processing completed) to the information processing device 1B. When the display controller 113 of the information processing device 1B acquires the results of the recognition processing and the translation processing, and the status information (processing completed) from the information processing device 1A, the display controller 113 of the information processing device 1B displays, as shown in FIG. 5, the results of the recognition processing and the translation processing for "Konnichiwa" in the first display area R1. Moreover, the display controller 113 of the information processing device 1B may display the time when user A made the utterance (here, "17:39:36") (i.e., an example of the first text of the present disclosure) in the first display area R1. Note that the text corresponding to the voice of user A is not displayed in the second display area R2 of the information processing device 1B.

The correction reception portion 114 receives a correction operation of user A for the text displayed in the second display area R2. For example, in a case where the utterance of user A is recognized as "Konnichiwa" and displayed as "こんにちは。" (representing "Konnichiwa" in Japanese) in the information processing devices 1A and 1B even though user A uttered "Konbanwa", user A can modify the text in the second display area R2. For example, if user A deletes a part of "こんにちは。" (representing "Konnichiwa" in Japanese) (see FIG. 6) and performs an operation to correct the text to "こんばんは。" (representing "Konbanwa" in Japanese) (see FIG. 7), the correction reception portion 114 receives the correction operation of user A.

As described above, the first display area R1 is an area where exchange (a log) of a voice-recognized text is mainly displayed. For example, in the first display area R1, a speaker, a time stamp, and a translated result are displayed, other than the text. Further, display contents of the first display area R1 can be viewed by both the user himself/herself and the person on the other side. The second display area R2 is an area where the voice-recognized text is displayed character by character in real time. The voice-recognized characters are first displayed in the second display area R2. When the user's utterance is paused, voice-recognized and translated texts are displayed in the first display area R1. Even if a result of voice recognition is displayed in the first display area R1, the text which has been voice-recognized previously continues to be displayed in the second display area R2 unless the next voice recognition is performed. The user can correct the text displayed in the second display area R2 by an operation using a keyboard and a mouse, and retransmit the corrected text. Further, display contents of the second display area R2 can be viewed only by the user himself/herself.

Figure 6:
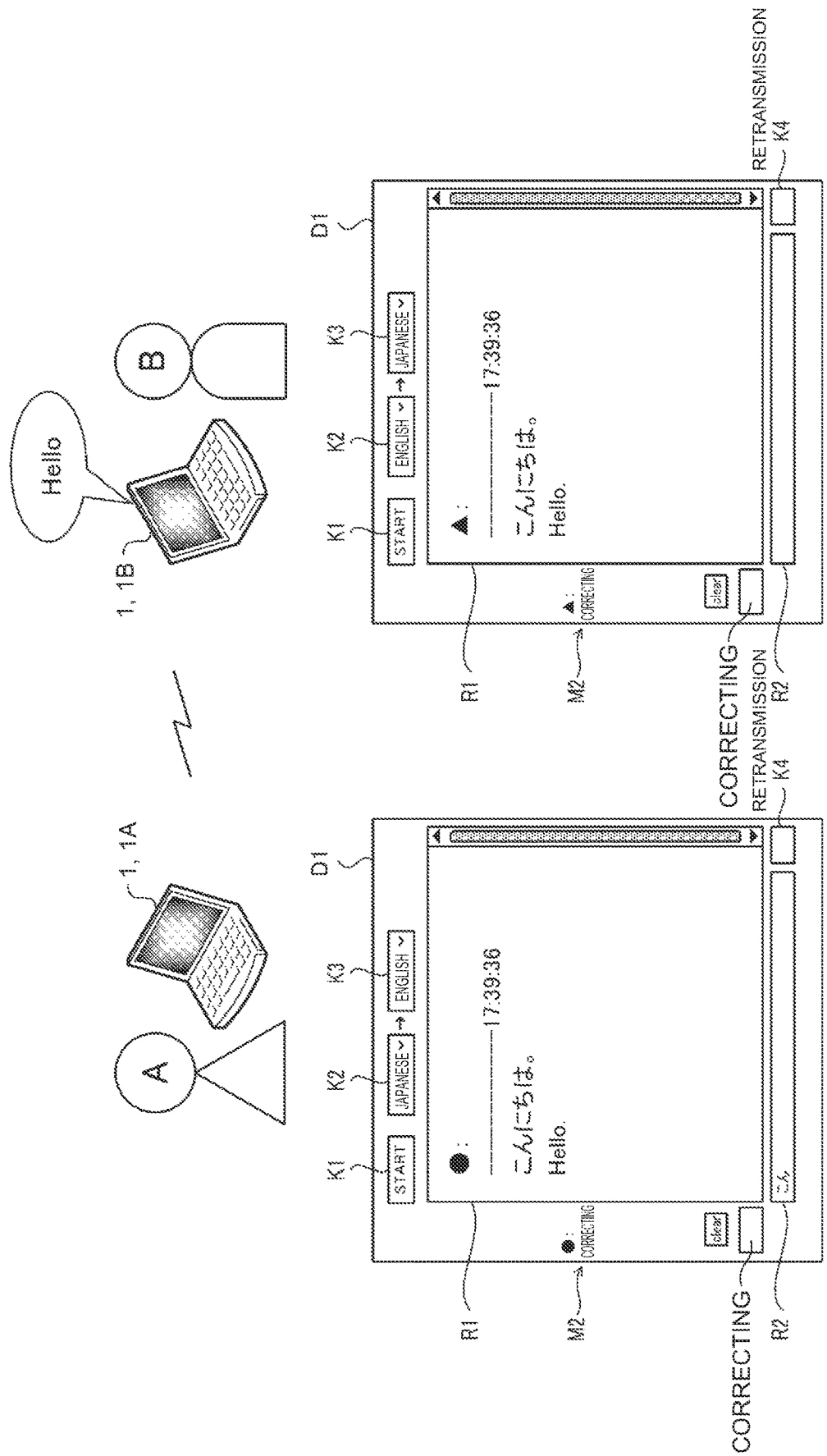
FIG. 6 is a diagram illustrating an example of a display screen displayed in an information processing device of the conferencing system according to the embodiment of the present disclosure.

When reception of the correction operation of user A is started, the display controller 113 of the information processing device 1A displays, as shown in FIG. 6, identification information (a correction-in-progress mark M2) indicating that correction is being performed on the display screen D1. Also, the display controller 113 transmits the status information indicating that user A is correcting the text to the information processing device 1B. When the display controller 113 of the information processing device 1B acquires the status information (correcting) from the information processing device 1A, the display controller 113 of the information processing device 1B displays, as shown in FIG. 6, identification information (correction-in-progress mark M2) indicating that user A is performing correction on the display screen D1 of the information processing device 1B. Note that the correction-in-progress mark M2 may be different for each information processing device 1, or may include information (the name, user ID, etc.) by which the user who is performing the correction can be identified. The correction-in-progress mark M2 is an example of correction operation information of the present disclosure.

Figure 7:
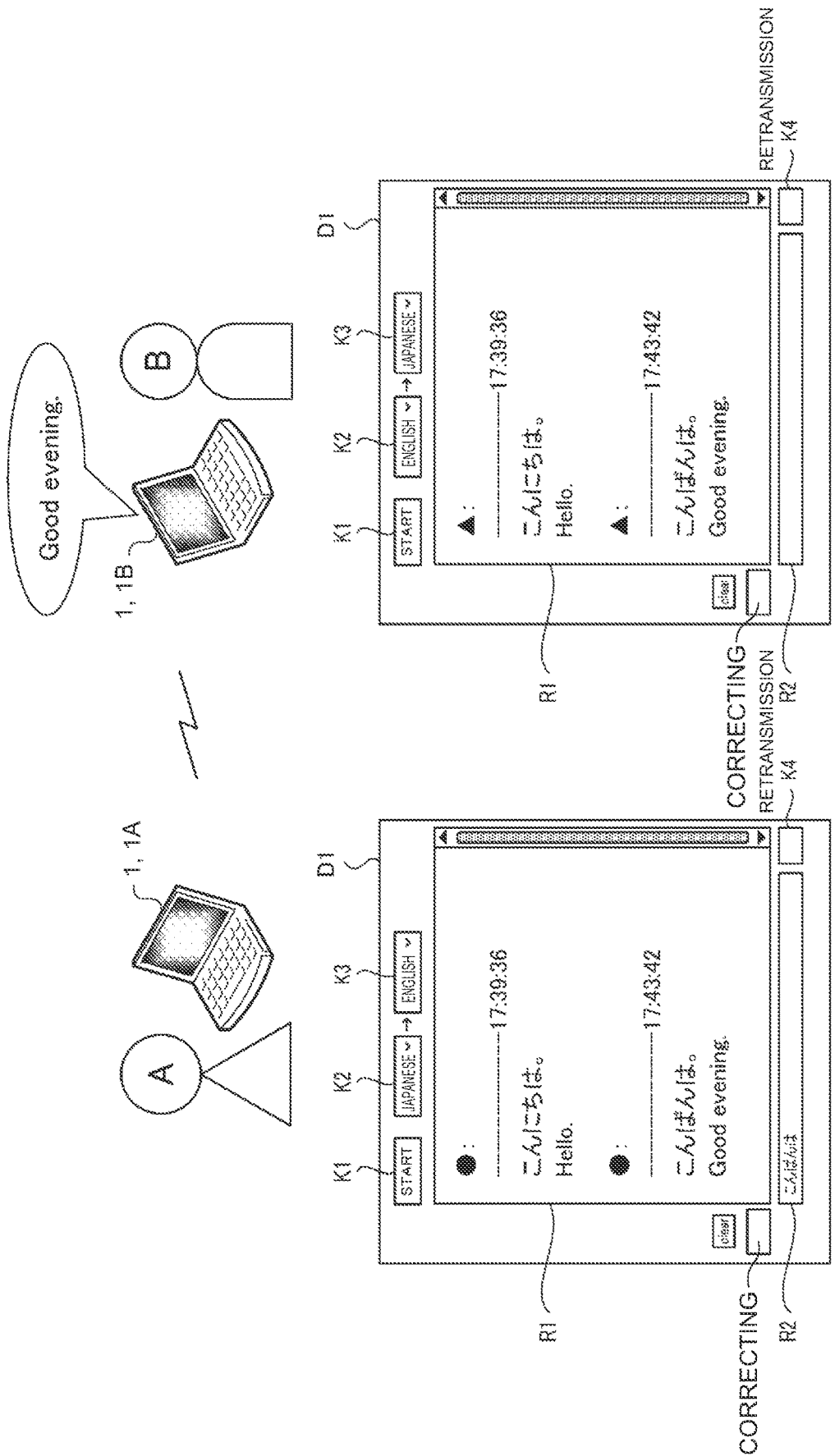
FIG. 7 is a diagram illustrating an example of a display screen displayed in an information processing device of the conferencing system according to the embodiment of the present disclosure.

When user A completes the correction operation and presses the button K4, the processing requestor 112 makes a request again to the server 2 for the translation processing. When the server 2 acquires a voice translation request from the information processing device 1A, the server 2 executes the translation processing on the text after correction, and transmits a translation result to the information processing device 1A. As shown in FIG. 7, the display controller 113 of the information processing device 1A displays the corrected text ("こんばんは。" [representing "Konbanwa" in Japanese]) in the first display area R1, acquires a result of the translation processing for "こんばんは。" (representing "Konbanwa" in Japanese) from the server 2, and displays the result in the first display area R1. Further, the display controller 113 of the information processing device 1A may display the time when user A made the correction (here, "17:43:42") in the first display area R1. By virtue of the above feature, since user B can understand that user A is correcting the erroneously voice-recognized and translated text, it is possible to prevent user B from responding (replying) to the erroneously voice-recognized and translated text, and the conference can be conducted efficiently.

Further, the display controller 113 of the information processing device 1A transmits the corrected text ("こんばんは。" [representing "Konbanwa" in Japanese]), the corrected result of the translation processing, and the status information (processing completed) to the information processing device 1B. When the display controller 113 of the information processing device 1B acquires the text ("こんばんは。" [representing "Konbanwa" in Japanese]), the result of the translation processing, and the status information (processing completed) from the information processing device 1A, the display controller 113 of the information processing device 1B displays, as shown in FIG. 7, the corrected text ("こんばんは。" [representing "Konbanwa" in Japanese]), and the result of the translation processing for "こんばんは。" (representing "Konbanwa" in Japanese) in the first display area R1. In this way, the display controller 113 of each of the information processing devices 1A and 1B displays the text after correction ("こんばんは。" [representing "Konbanwa" in Japanese]) in the first display area R1. Moreover, the display controller 113 of the information processing device 1B may display the time when user A made the correction (here, "17:43:42") in the first display area R1. Note that the text corresponding to the correction operation of user A is not displayed in the second display area R2 of the information processing device 1B. That is, the second display area R2 is an area for receiving the correction operation for the text from the speaker.

Figure 8:
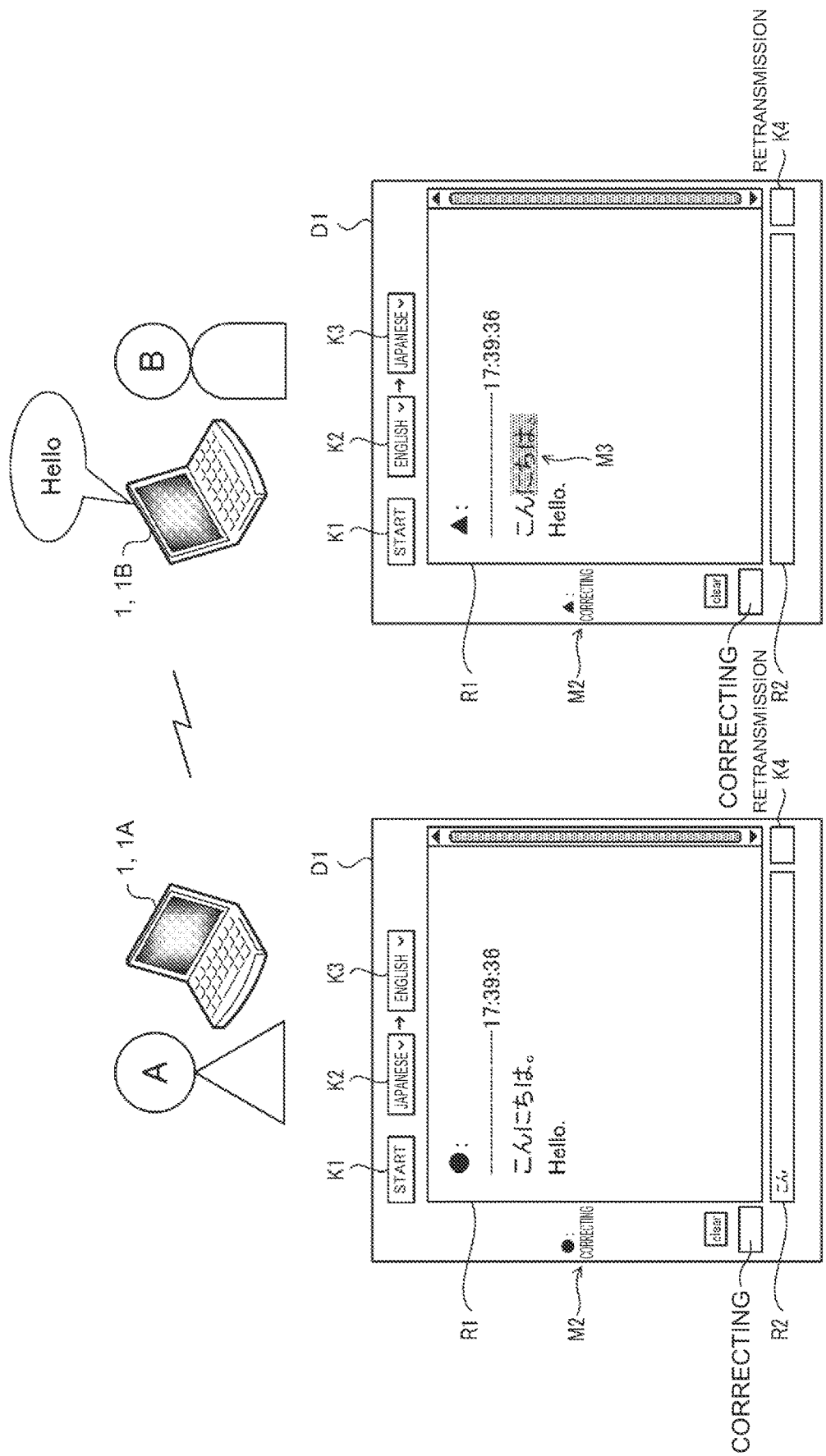
FIG. 8 is a diagram illustrating an example of a display screen displayed in an information processing device of the conferencing system according to the embodiment of the present disclosure.

Here, the display controller 113 of the information processing device 1B may display, as shown in FIG. 8, the part corrected by user A ("ばんは。" [representing "banwa" in Japanese]) in the erroneously recognized text ("こんにちは。" [representing "Konnichiwa" in Japanese]) such that it is distinguishable in the first display area R1 of the information processing device 1B. For example, as shown in FIG. 8, the display controller 113 may add an identification mark M3 to the corrected part. For example, the display controller 113 may apply shading display to a part, which corresponds to the part ("にちは。" [representing "nichiwa" in Japanese]) deleted in the second display area R2 of the information processing device 1A, in the text displayed in the first display area R1 of the information processing device 1B. In this way, the display controller 113 displays, while user A is correcting the text, the corrected part of the text in question in real time in the first display area R1 of the information processing device 1B such that it is distinguishable. By virtue of the above feature, user B can ascertain the corrected part of the text corrected by user A in real time. Examples of the identification mark M3 include shading (FIG. 8), an underline, a color for the characters, and a character font. By virtue of the above feature, user B can ascertain the portion (part) being corrected by user A.

Figure 9:
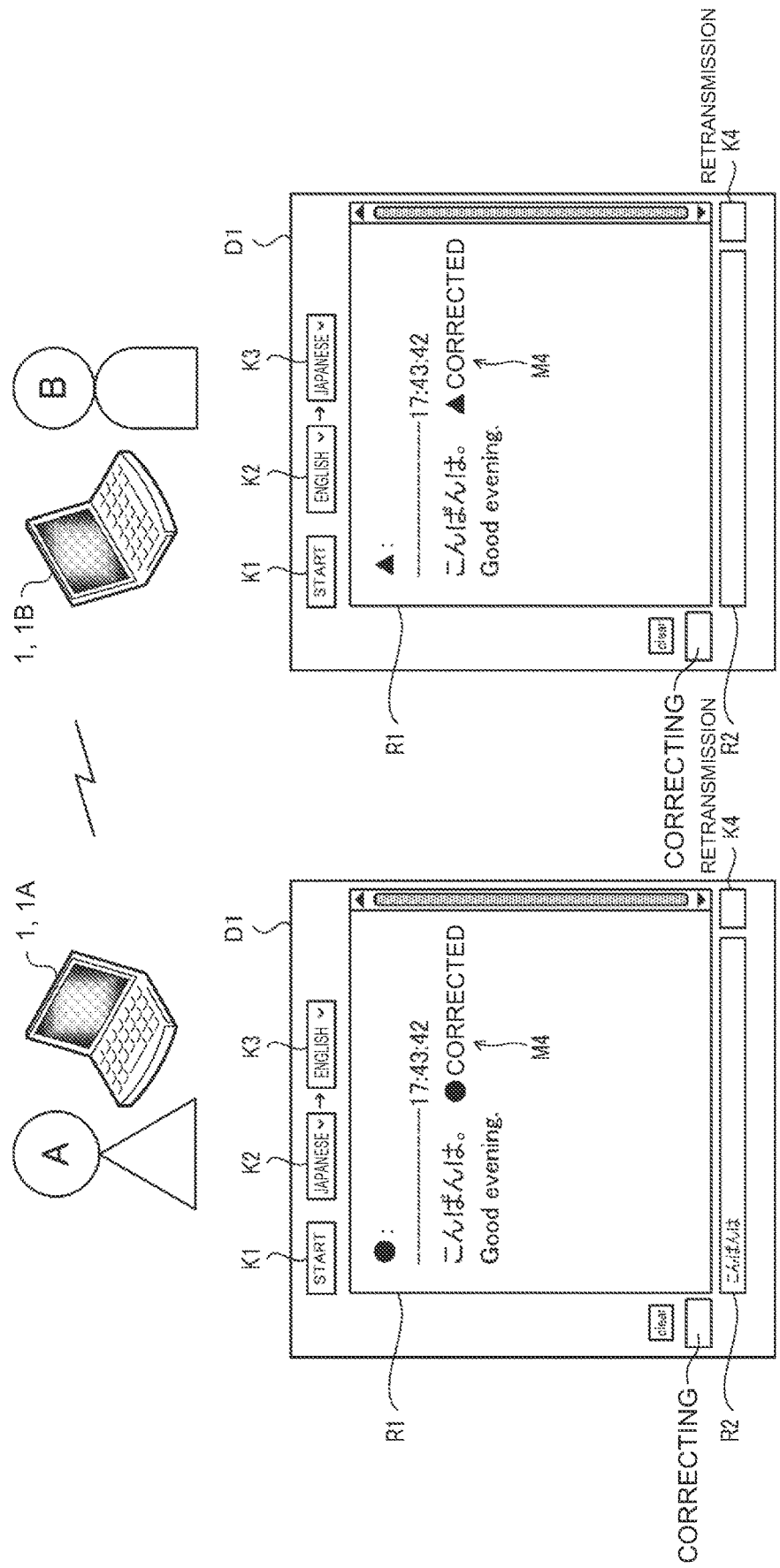
FIG. 9 is a diagram illustrating an example of a display screen displayed in an information processing device of the conferencing system according to the embodiment of the present disclosure.
Figure 10:
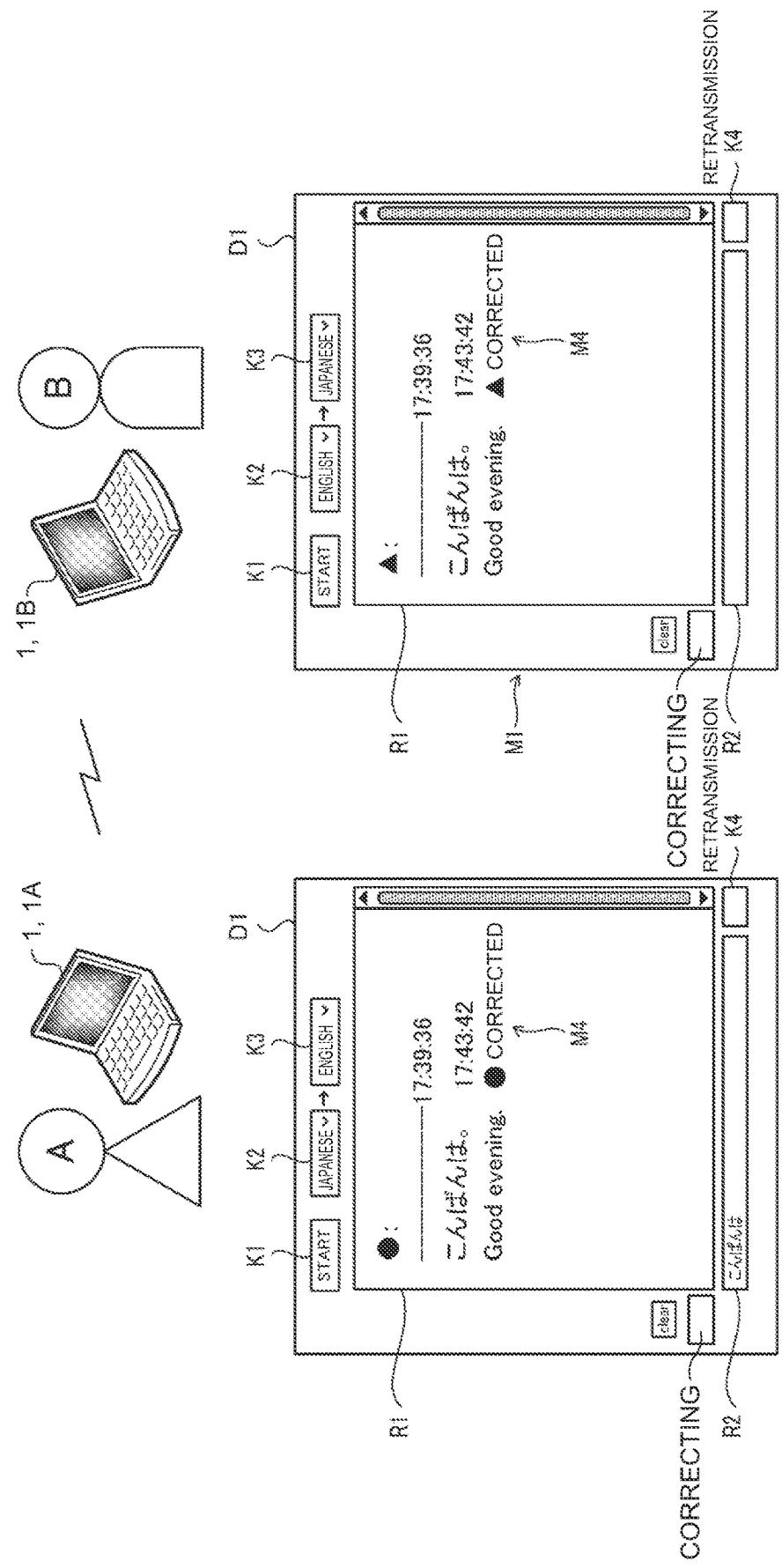
FIG. 10 is a diagram illustrating an example of a display screen displayed in an information processing device of the conferencing system according to the embodiment of the present disclosure.
Figure 11:
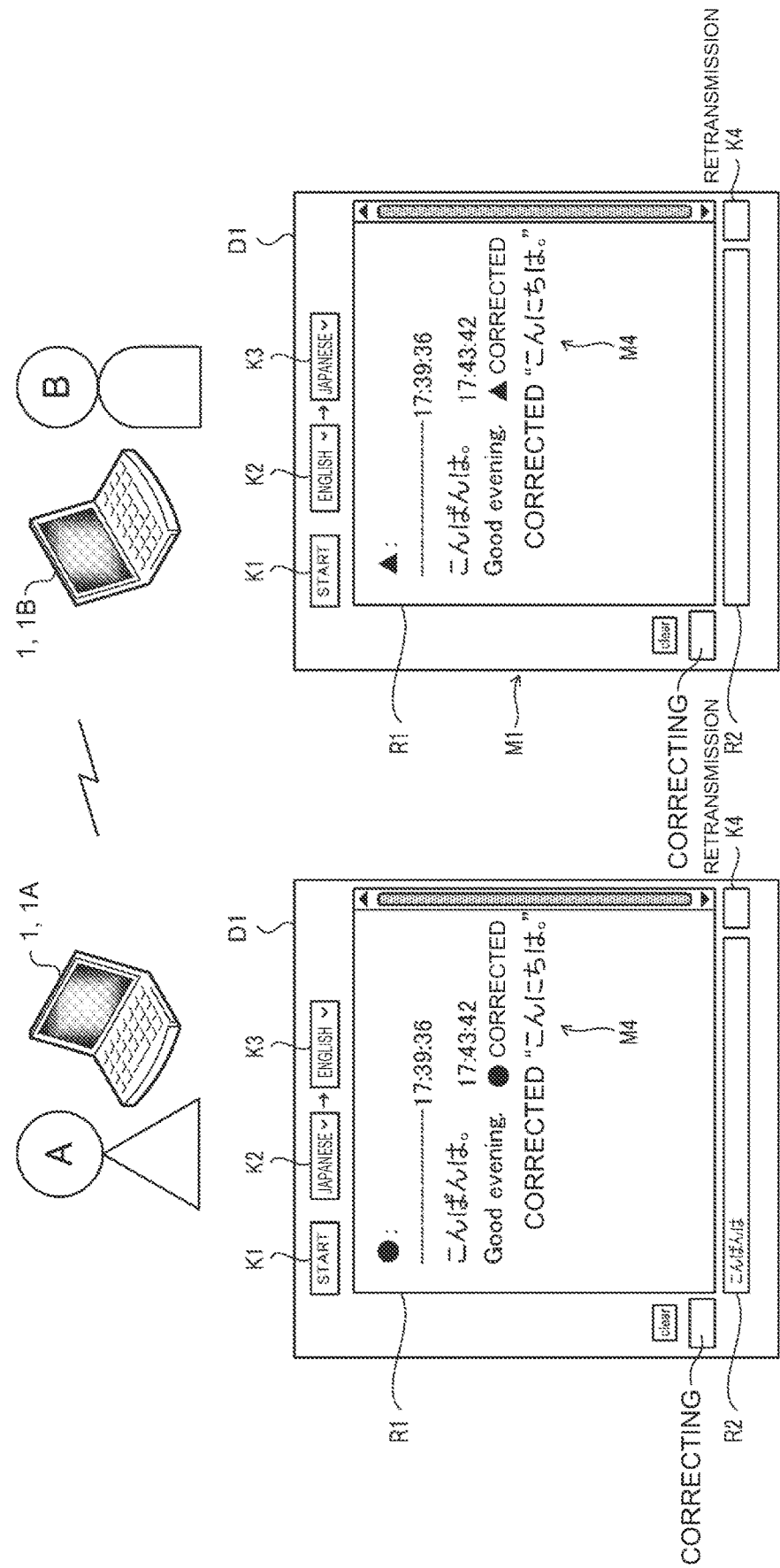
FIG. 11 is a diagram illustrating an example of a display screen displayed in an information processing device of the conferencing system according to the embodiment of the present disclosure.

The display controller 113 of each of the information processing devices 1A and 1B may delete the text before correction ("こんにちは。" [representing "Konnichiwa" in Japanese]), and display the text after correction ("こんばんは。" [representing "Konbanwa" in Japanese]) in the first display area R1. By doing so, since only the appropriate information can be displayed in the first display area R1, it is possible to prevent user B from getting confused from the information before correction. Also, in this case, the display controller 113 of each of the information processing devices 1A and 1B may display, as shown in FIG. 9, identification information (a correction-completed mark M4) indicating that user A has made the correction in the first display area R1. By virtue of the above feature, users A and B can determine whether the text displayed in the first display area R1 has been corrected or not. Further, as shown in FIG. 10, the display controller 113 of each of the information processing devices 1A and 1B may display the utterance time ("17:39:36") for the text before correction and the time when the correction was made ("17:43:42") in the first display area R1. By virtue of the above feature, users A and B can ascertain the time when the text displayed in the first display area R1 was corrected. Also, as shown in FIG. 11, the display controller 113 of each of the information processing devices 1A and 1B may display information on the text before correction and information on the text after correction side by side in the first display area R1. By virtue of the above feature, users A and B can ascertain the texts which are of before and after correction, and can easily understand the details of the correction. In this way, the display controller 113 may overwrite the text before correction with the text after correction, or may display the text after correction at a place different from the place of the text before correction. Further, in a case where the text before correction is overwritten with the text after correction, in order to allow the user to ascertain whether a correction has been made, the display controller 113 should preferably display, as shown in FIGS. 9 to 11, information (identification mark M4, utterance time and correction time, texts which are of before and after correction, etc.) indicating that the correction has been made.

Figure 12:
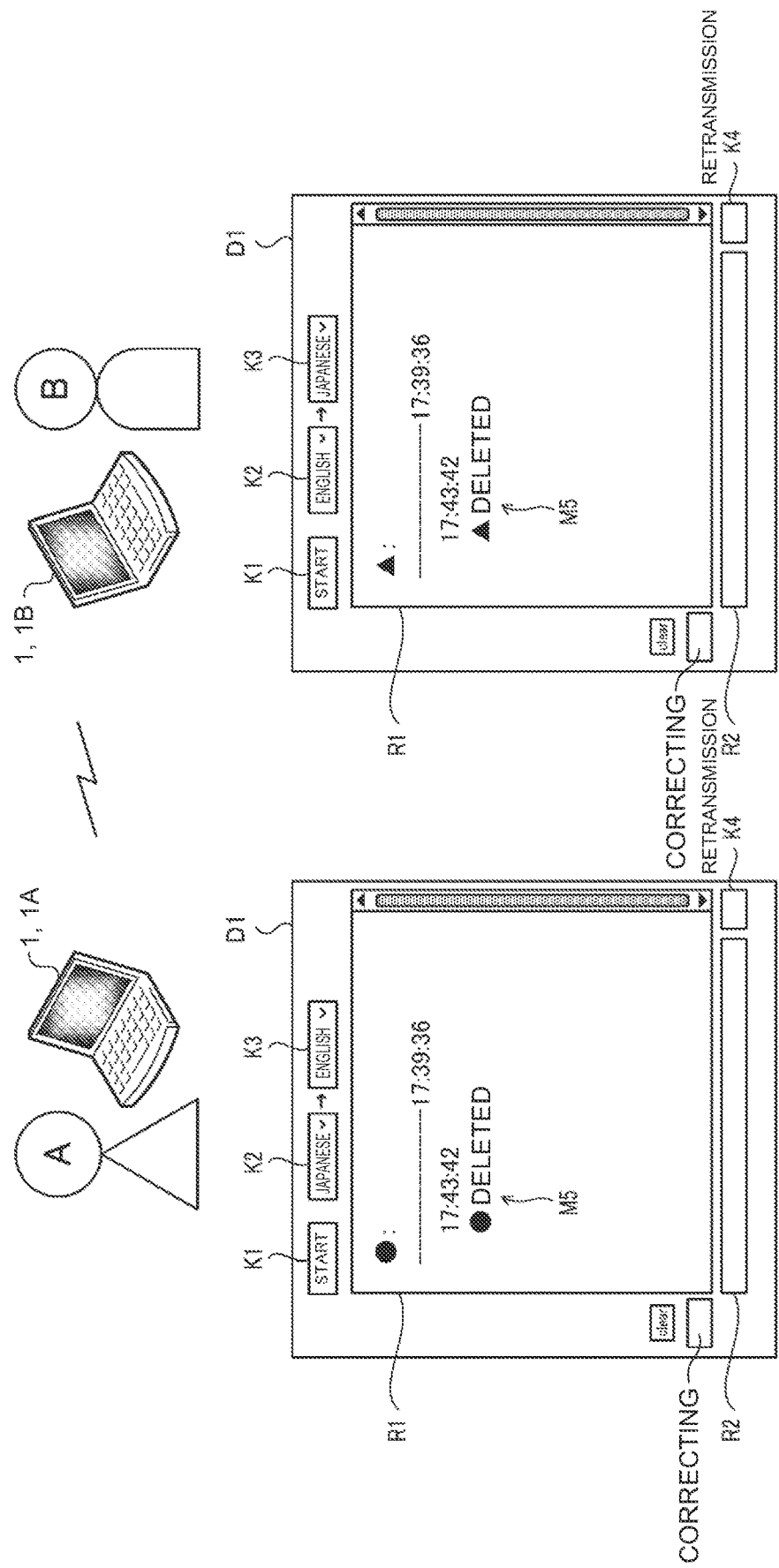
FIG. 12 is a diagram illustrating an example of a display screen displayed in an information processing device of the conferencing system according to the embodiment of the present disclosure.

Note that if user A has performed a deletion operation for the erroneously recognized text, the display controller 113 of each of the information processing devices 1A and 1B may display, as shown in FIG. 12, the deleted time and identification information (a deletion mark M5) indicating that deletion has been made in the first display area R1. By virtue of the above feature, it is possible to prevent not only erroneous recognition, but also confusion, by deleting utterance not intended to be sent to the person on the other side at all, such as murmuring to oneself.

The voice requestor 115 requests the server 2 to convert the results (texts) of the recognition processing and the translation processing into voice. Specifically, the voice requestor 115 of the information processing device 1B transmits, to the server 2, a request for converting the results (texts) of the recognition processing and the translation processing acquired from the information processing device 1A into voice. When the server 2 acquires a voice conversion request from the information processing device 1B, the server 2 executes voice conversion processing on the text, and transmits a conversion result to the information processing device 1B. For example, the server 2 converts the translation result "Hello" for the text "こんにちは。" (representing "Konnichiwa" in Japanese) into voice data, and transmits the voice data to the information processing device 1B. When the voice requestor 115 of the information processing device 1B acquires the voice data from the server 2, the voice requestor 115 of the information processing device 1B causes a voice saying "Hello" to be output (reproduced) from the speaker 13 of the information processing device 1B, as shown in FIG. 5. Note that in a case where user A has corrected the above-mentioned text "こんにちは。" (representing "Konnichiwa" in Japanese) to "こんばんは。" (representing "Konbanwa" in Japanese), the voice requestor 115 of the information processing device 1B acquires voice data of the translation result "Good evening" for "こんばんは。" (representing "Konbanwa" in Japanese) from the server 2, and causes a voice saying "Good evening" to be output from the speaker 13 of the information processing device 1B, as shown in FIG. 7. By virtue of the above feature, for example, user A who uses Japanese and user B who uses English can have a conversation smoothly. Note that the controller 11 may be configured such that when the text is corrected by the user, the user can arbitrarily select whether or not to voice-output the corrected text. For example, the controller 11 may display a selection screen (not illustrated) for selecting whether or not to voice-output the corrected text in the information processing device 1 to receive a selection operation from the user.

Server 2

As illustrated in FIG. 2, the server 2 includes a controller 21, a storage 22, a communication interface 23, and the like. Note that the server 2 is not limited to a single computer, but may be a computer system in which a plurality of computers operate in cooperation with each other. Further, the server 2 may be a physical server or a cloud server. Furthermore, various kinds of processing to be executed by the server 2 may be executed in a distributed manner by one or more processors.

The communication interface 23 is a communication interface for connecting the server 2 to the network N1 in a wired or wireless manner, and executing data communication conforming to a predetermined communication protocol with the other devices (for example, the information processing devices 1A and 1B) via the network N1.

The storage 22 is a non-volatile storage such as a hard disk drive (HDD) or a solid state drive (SSD) which stores various kinds of information. The storage 22 stores a control program such as an information processing program for causing the controller 21 to execute information processing (FIGS. 13 and 14) to be described later. For example, the information processing program is distributed from an external server and stored. Further, the information processing program may be permanently recorded on a computer-readable recording medium such as a CD or a DVD, and stored in the storage 22 by being read by a reading device (not illustrated) such as a CD drive or a DVD drive provided in the server 2.

The controller 21 includes control devices such as a CPU, a ROM, and a RAM. The CPU is a processor which executes various kinds of arithmetic processing. The ROM stores in advance the control programs such as a BIOS and an OS for causing the CPU to execute various kinds of processing. The RAM stores various kinds of information, and is used as a temporary storage memory (work area) for the various kinds of processing that the CPU executes. Further, the controller 21 controls the server 2 by having the CPU execute various control programs stored in advance in the ROM or the storage 22.

Specifically, the controller 21 includes various processing portions such as the voice recognizer 211, a voice translator 212, and a voice converter 213. Note that the controller 21 functions as various processing portions as described above by having the CPU execute various kinds of processing according to the control program. Also, a part of or all of the processing portions included in the controller 21 may be configured by an electronic circuit. Further, the information processing program may be a program for causing a plurality of processors to function as various processing portions mentioned above.

The voice recognizer 211 executes, on the basis of the voice recognition request, recognition processing of recognizing the user's voice received by the voice receiver 111 of the information processing device 1. Specifically, when the voice recognizer 211 acquires the voice recognition request from the information processing device 1A, the voice recognizer 211 recognizes "ko" uttered by user A, and converts it into "こ", which is the text information for "ko". Also, the voice recognizer 211 recognizes "Konnichiwa" uttered by user A, and converts it into "こんにちは。", which is the text information for "Konnichiwa". When the above-mentioned text information includes a word that can be converted into kanji (Chinese character), the voice recognizer 211 converts the text information into a kanji text. The voice recognizer 211 transmits a recognition result (text) of the voice to the information processing device 1A, which is a request source of the voice recognition request.

The voice translator 212 executes, on the basis of the voice translation request, translation processing of translating the text acquired from the information processing device 1. Specifically, in a case where user A has selected "Japanese" by the button K2, and selected "English" by the button K3 on the display screen D1 (FIG. 3), when the voice translator 212 acquires the voice translation request for the text "こんにちは。" (representing "Konnichiwa" in Japanese) from the information processing device 1A, the voice translator 212 converts "こんにちは。" (representing "Konnichiwa" in Japanese) into "Hello". The voice translator 212 transmits a translation result (text) of the above-mentioned text to the information processing device 1A, which is a request source of the voice translation request.

The voice converter 213 executes, on the basis of the voice conversion request, voice conversion processing of converting the text acquired from the information processing device 1 into voice. Specifically, when the voice converter 213 acquires the voice conversion request for the text "Hello" from the information processing device 1B, the voice converter 213 converts the text "Hello" into voice data of "Hello". The voice converter 213 transmits a conversion result (voice data) of the above-mentioned text to the information processing device 1B, which is a request source of the voice conversion request.

Information Processing

Figure 13:
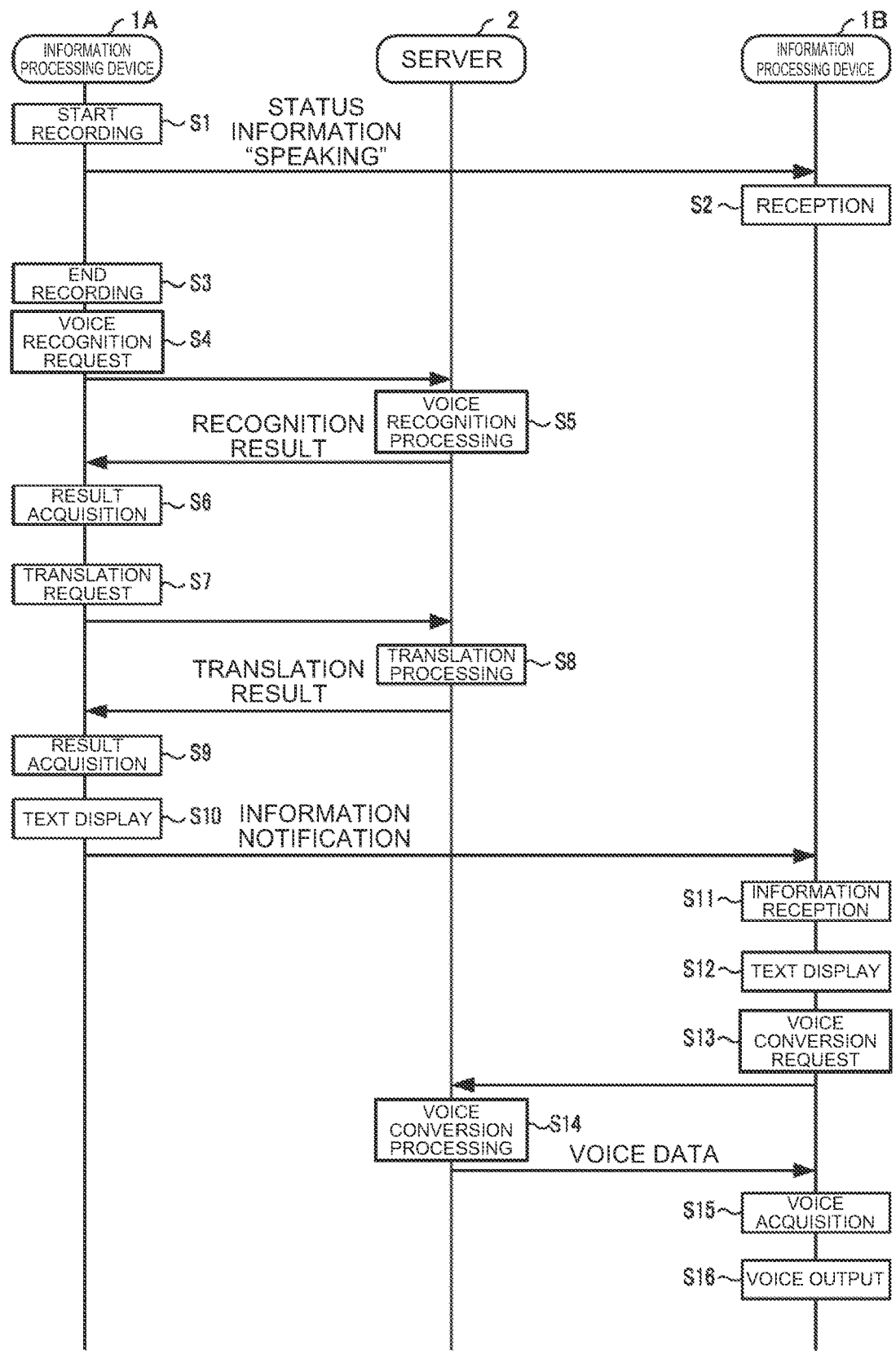
FIG. 13 is a flowchart for explaining an example of a procedure of information processing in the conferencing system according to the embodiment of the present disclosure.
Figure 14:
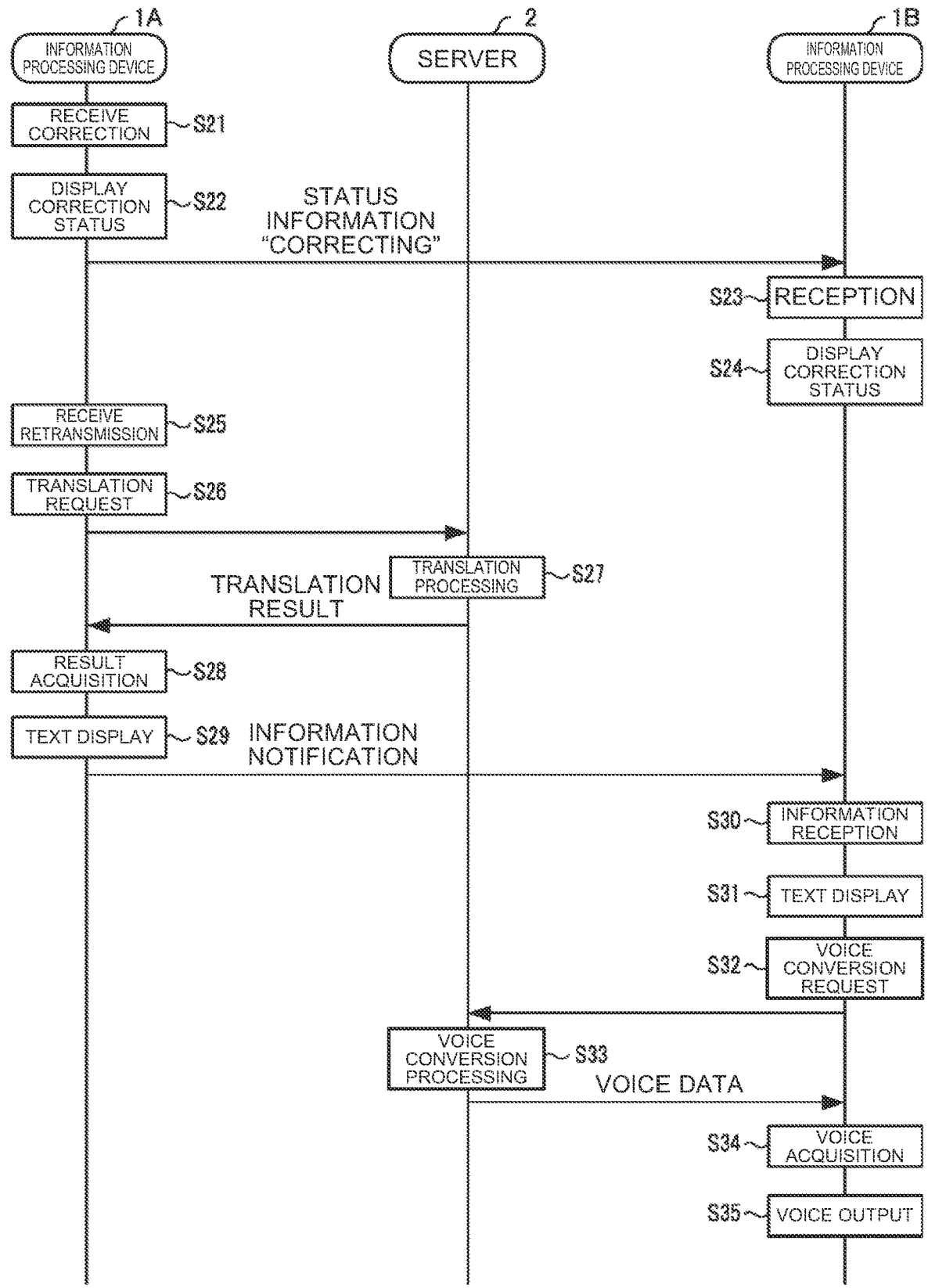
FIG. 14 is a flowchart for explaining an example of a procedure of information processing in the conferencing system according to the embodiment of the present disclosure.

In the following, an example of a procedure of information processing to be executed by the conferencing system 100 will be described with reference to FIG. 13. The information processing is executed by, for example, the controller 11 of the information processing device 1A, the controller 11 of the information processing device 1B, and the controller 21 of the server 2. For example, as the controller 11 of each of the information processing devices 1A and 1B starts execution of the information processing program by starting a conferencing system, execution of the information processing is started.

Note that the present disclosure can be regarded as an disclosure of an information processing method of executing one or more steps included in the information processing. Further, one or more steps included in the information processing described herein may be omitted as appropriate. In addition, the steps of the information processing may be executed in a different order as long as similar effect and advantage can be obtained. Furthermore, the present specification describes a case where each of the steps of the information processing is executed by the controller 11 of the information processing device 1A, the controller 11 of the information processing device 1B, and the controller 21 of the server 2 as an example. However, in another embodiment, the steps of the information processing may be executed in a distributed manner by one or more processors.

In step S1, the controller 11 of the information processing device 1A starts recording of a voice uttered by user A. For example, when user A presses the button K1 on the display screen D1, the controller 11 of the information processing device 1A starts the recording, and receives the voice of user A from the microphone 14. Also, the controller 11 of the information processing device 1A transmits status information indicating that the voice of user A is being received (in other words, user A is speaking) to the information processing device 1B.

In step S2, when the controller 11 of the information processing device 1B receives the status information (speaking) from the information processing device 1A, the controller 11 of the information processing device 1B displays, as shown in FIG. 4, identification information (the speaking-in-progress mark M1) indicating that user A is speaking on the display screen D1 of the information processing device 1B.

When user A presses the button K1 on the display screen D1, the controller 11 of the information processing device 1A ends the recording (S3), and transmits a voice recognition request to the server 2 (S4). For example, the controller 11 transmits a voice recognition request corresponding to the utterance "Konnichiwa" of user A to the server 2.

In step S5, when the controller 21 of the server 2 receives the voice recognition request from the information processing device 1A, the controller 21 executes recognition processing of recognizing the voice of user A. For example, the controller 21 recognizes "Konnichiwa" uttered by user A, and converts it into "こんにちは。", which is the text information for "Konnichiwa". The controller 21 transmits a recognition result (text) of the voice to the information processing device 1A, which is a request source of the voice recognition request.

When the controller 11 of the information processing device 1A acquires the recognition result from the server 2 (S6), the controller 11 transmits a voice translation request corresponding to the acquired recognition result to the server 2 (S7). For example, the controller 11 transmits a voice translation request corresponding to the text "こんにちは。" (representing "Konnichiwa" in Japanese) to the server 2.

In step S8, when the controller 21 of the server 2 receives the voice translation request from the information processing device 1A, the controller 21 executes translation processing of translating the above-mentioned text. For example, the controller 21 translates "こんにちは。", which is Japanese representing "Konnichiwa", into "Hello", which is English. The controller 21 transmits a translation result (text) of the text to the information processing device 1A, which is a request source of the voice translation request.

When the controller 11 of the information processing device 1A acquires the translation result from the server 2 (S9), the controller 11 causes the text, which is "Hello" corresponding to the acquired translation result, to be displayed in the first display area R1 (see FIG. 5) (S10). Further, the controller 11 of the information processing device 1A transmits results of the recognition processing and the translation processing, and status information (processing completed) to the information processing device 1B.

When the controller 11 of the information processing device 1B receives the results of the recognition processing and the translation processing, and the status information (processing completed) from the information processing device 1A (S11), the controller 11 of the information processing device 1B displays, as shown in FIG. 5, the results of the recognition processing and the translation processing for "Konnichiwa" in the first display area R1 (S12).

In step S13, the controller 11 of the information processing device 1B transmits a voice conversion request to the server 2. For example, the controller 11 of the information processing device 1B transmits a voice conversion request corresponding to the translation result "Hello" to the server 2.

In step S14, when the controller 21 of the server 2 receives the voice conversion request from the information processing device 1B, the controller 21 executes voice conversion processing of converting the text acquired from the information processing device 1B into voice. For example, when the controller 21 acquires the voice conversion request for the text "Hello" from the information processing device 1B, the controller 21 converts it into voice data of "Hello". The controller 21 transmits a conversion result (voice data) of the above-mentioned text to the information processing device 1B, which is a request source of the voice conversion request.

When the controller 11 of the information processing device 1B acquires the conversion result (voice data) from the server 2 (S15), the controller 11 causes a voice corresponding to the acquired conversion result to be output (reproduced) from the speaker 13. For example, the controller 11 causes a voice saying "Hello" to be output (reproduced) from the speaker 13 of the information processing device 1B.

Here, in a case where a correction operation (FIG. 6) for the recognition result (text) is received from user A (step S21 of FIG. 14) after the recognition result (text) corresponding to the utterance of user A has been displayed in the first display area R1 and the second display area R2 of the information processing device 1A, the controller 11 of the information processing device 1A causes identification information (the correction-in-progress mark M2) indicating that the text is being corrected to be displayed on the display screen D1 of the information processing device 1A (S22). Also, when the controller 11 of the information processing device 1B receives the status information indicating that user A is correcting the text from the information processing device 1A (S23), the controller 11 of the information processing device 1B causes the correction-in-progress mark M2 to be displayed on the display screen D1 of the information processing device 1B (S24).

When user A finishes the correction operation and presses the button K4 for retransmission (S25), the controller 11 of the information processing device 1A transmits a voice translation request for the text after correction to the server 2 (S26). For example, the controller 11 transmits a voice translation request corresponding to the text "こんばんは。" (representing "Konbanwa" in Japanese) to the server 2.

In step S27, when the controller 21 of the server 2 receives the voice translation request from the information processing device 1A, the controller 21 executes the translation processing of translating the above-mentioned text. For example, the controller 21 translates "こんばんは。", which is Japanese representing "Konbanwa", into "Good evening", which is English. The controller 21 transmits a translation result (text) of the text after correction to the information processing device 1A, which is a request source of the voice translation request. The subsequent processing (S28 to S35) are the same as the processing (S9 to S16) shown in FIG. 13.

The conferencing system 100 executes the information processing as described above. As stated above, the conferencing system 100 according to the present embodiment can transmit and receive text information corresponding to a voice uttered by the user in the information processing devices 1A and 1B that are connected to each other via the network N1. Also, the conferencing system 100 receives the voice uttered by user A of the information processing device 1A, and recognizes the voice. Further, the conferencing system 100 displays a text corresponding to the voice which has been recognized in each of the first display areas R1 of the information processing devices 1A and 1B, and the second display area R2 of the information processing device 1A. Furthermore, the conferencing system 100 receives a correction operation of user A for the text displayed in the second display area R2. By virtue of the above feature, in a case where an error occurs in the text information corresponding to the voice uttered by user A, for example, user A can correct the text, and thus appropriate text information can be smoothly transmitted and received. Moreover, when user A is performing the correction operation, since information indicating that the text is being corrected is displayed in the information processing device 1B, user B can understand that the text is to be corrected. Therefore, it is possible to prevent user B from responding to the erroneous text.

The information processing system of the present disclosure is not limited to the above-described configuration.

The conferencing system 100 need not be provided with a translation function. In this case, the conferencing system 100 transmits and receives text information of the same language in the information processing devices 1A and 1B.

Figure 15:
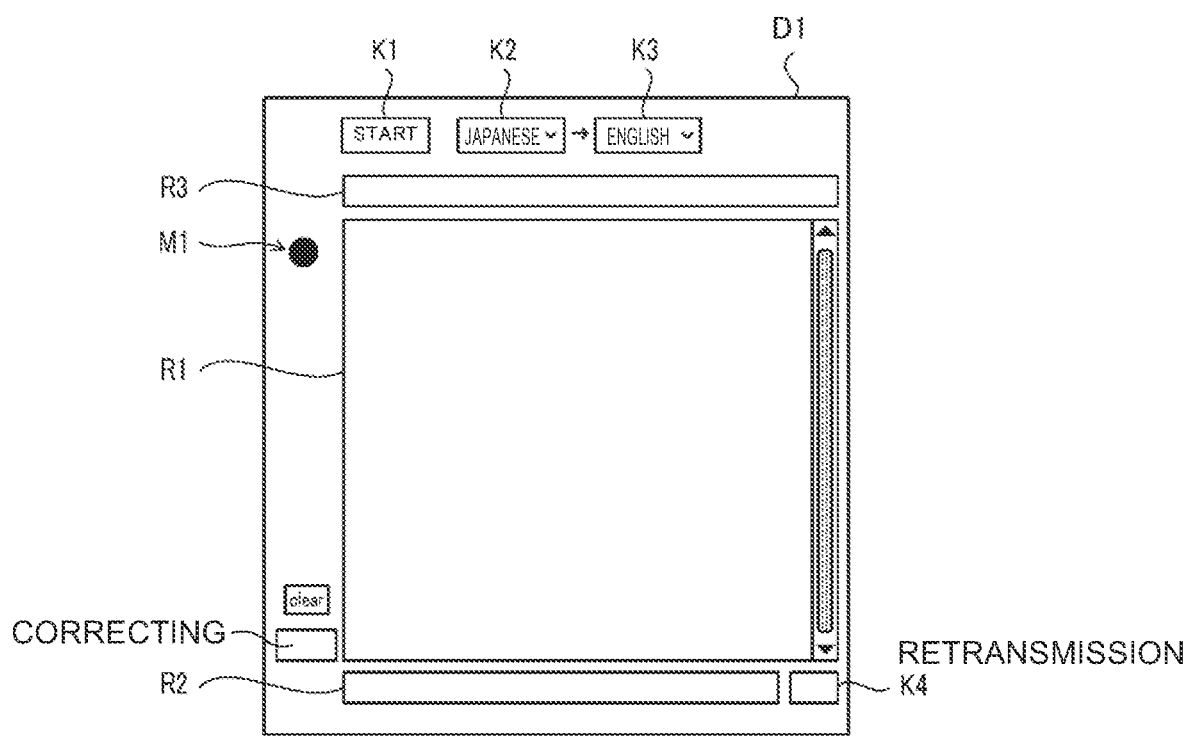
FIG. 15 is a diagram illustrating an example of a display screen displayed in an information processing device of the conferencing system according to the embodiment of the present disclosure.

Further, in the conferencing system 100, the display controller 113 of the information processing device 1A may cause a text (an example of a second text of the present disclosure), which corresponds to a voice (an example of a second voice of the present disclosure) uttered by user B of the information processing device 1B, to be displayed in a third display area R3 of the information processing device 1A, as shown in FIG. 15. That is, on the display screen D1, a result of voice recognition of the utterance content of user A (an example of a first user of the present disclosure) is displayed in the second display area R2 in real time, a result of voice recognition of the utterance content segmented at a predetermined timing is displayed in the first display area R1, and a result of voice recognition of the utterance content of user B (an example of a second user of the present disclosure) is displayed in the third display area R3 in real time. Note that the third display area R3 displays the details of the correction operation of user B for the text corresponding to the utterance content of user B. Consequently, user A can understand that user B is correcting the text, and the portion being corrected, and the like.

Note that in the first display area R1, pieces of utterance content are displayed from top to bottom in chronological order in the order of occurrence of the utterance. That is, in the first display area R1, the latest utterance content is displayed at the bottommost position. For this reason, the second display area R2 should preferably be arranged below the first display area R1. As a result, since the utterance content to be corrected that is displayed in the first display area R1 is displayed near the second display area R2, the user can easily perform the correction operation in the second display area R2. Also, the third display area R3 should preferably be arranged above the first display area R1. As a result, since the second display area R2 and the third display area R3 are arranged separately from each other, the user can easily distinguish between the user's own correction operation and the correction operation of the person on the other side. Note that in a case where pieces of utterance content are displayed from bottom up in chronological order in the order of occurrence of the utterance in the first display area R1, in other words, in a case where the latest utterance content is displayed at the topmost position in the first display area R1, preferably, the second display area R2 should be arranged above the first display area R1, and the third display area R3 should be arranged below the first display area R1.

Further, in the conferencing system 100, the display controller 113 and the correction reception portion 114 of the information processing device 1 may be included in the server 2. Furthermore, in the conferencing system 100, the voice recognizer 211, the voice translator 212, and the voice converter 213 of the server 2 may be included in the information processing device 1.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

What is claimed is:

1. An information processing system which allows transmission and reception of text information corresponding to a voice uttered by a user by a first information processing device and a second information processing device that are connected to each other via a network, the information processing system comprising:

a voice receiver that receives a first voice uttered by a first user of the first information processing device;

a voice recognizer that recognizes the first voice received by the voice receiver;

a display controller that causes a first text, which corresponds to the first voice recognized by the voice recognizer, to be displayed in a first display area included in each of a display of the first information processing device and a display of the second information processing device; and a correction operation receiver that receives a correction operation of the first user for the first text, wherein the display controller further causes the second information processing device to report that the correction operation of the first user is being performed for the first text.

2. The information processing system according to claim 1, wherein:

each of the display of the first information processing device and the display of the second information processing device further includes a second display area that is different from the first display area, the display controller further causes the first text to be displayed in the second display area included in the display of the first information processing device and not to be displayed in the second display area included in the display of the second information processing device, and the correction operation receiver further receives the correction operation of the first user for the first text in the second display area included in the first information processing device and does not receive the correction operation of the first user in the first display area included in the first information processing device.

3. The information processing system according to claim 1, wherein the display controller further causes the second information processing device to report identification information of the first user.

4. The information processing system according to claim 1, wherein when the correction operation of the first user for the first text is received, the display controller further causes a corrected first text to be displayed in each of the first display area of the first information processing device and the second information processing device.

5. The information processing system according to claim 1, wherein the display controller further causes a part of the first text corrected by the first user to be displayed in a distinguishable way in the first display area of the second information processing device.

6. The information processing system according to claim 5, wherein the display controller causes the part of the first text corrected by the first user to be displayed in the distinguishable way in the first display area of the second information processing device at a same time that the first user is correcting the first text.

7. The information processing system according to claim 1, wherein the display controller further causes both the first text before being corrected by the first user and the first text after being corrected by the first user to be displayed in the first display area of the second information processing device.

8. The information processing system according to claim 2, wherein the display controller further causes the first text to be displayed in the second display area at a same time that the first voice is uttered by first user, and causes the first text to be displayed in the first display area during a period segmented at a predetermined timing.

9. The information processing system according to claim 2, wherein the display controller further causes the first text of a first language to be displayed in the second display area at a same time that the first voice is uttered by the first user in the first language, and causes the first text of a second language to be displayed in the first display area, wherein the first text of the second language is obtained by converting the first text during a period segmented at a predetermined timing into the second language.

10. The information processing system according to claim 2, wherein the display controller further causes a second text, which corresponds to a second voice uttered by a second user of the second information processing device, to be displayed in a third display area of the first information processing device.

11. An information processing method for allowing transmission and reception of text information corresponding to a voice uttered by a user by a first information processing device and a second information processing device that are connected to each other via a network, the information processing method comprising:

receiving a first voice uttered by a first user of the first information processing device;

recognizing the received first voice;

displaying a first text, which corresponds to the recognized first voice, in a first display area included in each of a display of the first information processing device and a display of the second information processing device;

receiving a correction operation of the first user for the first text; and reporting, by the second information processing device, that the correction operation of the first user is being performed for the first text.

12. A non-transitory computer-readable medium storing one or more instructions, that when executed by one or more processors, allow transmission and reception of text information corresponding to a voice uttered by a user by a first information processing device and a second information processing device that are connected to each other via a network, the one or more instructions, when executed by the one or more processors, further causing the one or more processors to:

receive a first voice uttered by a first user of the first information processing device;

recognize the received first voice;

display a first text, which corresponds to the recognized first voice, in a first display area included in each of a display of the first information processing device and a display of the second information processing device;

receive a correction operation of the first user for the first text; and report, by the second information processing device, that the correction operation of the first user is being performed for the first text.

* * * * *